Figure 4:
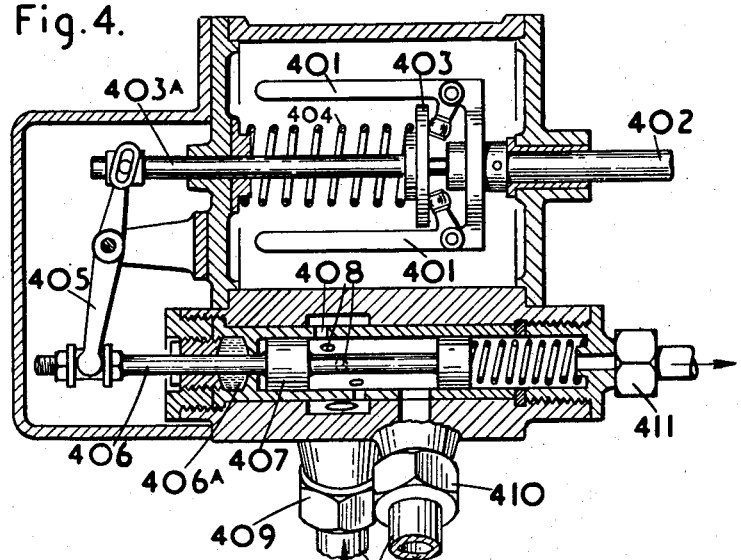

Jan. 25, 1955
G. B. R. FEILDEN ET AL
2,700,415
LIQUID FUEL SUPPLY SYSTEM FOR AIRCRAFT
COMBUSTION TURBINES
Original Filed Oct. 16, 1945
3 Sheets-Sheet 1
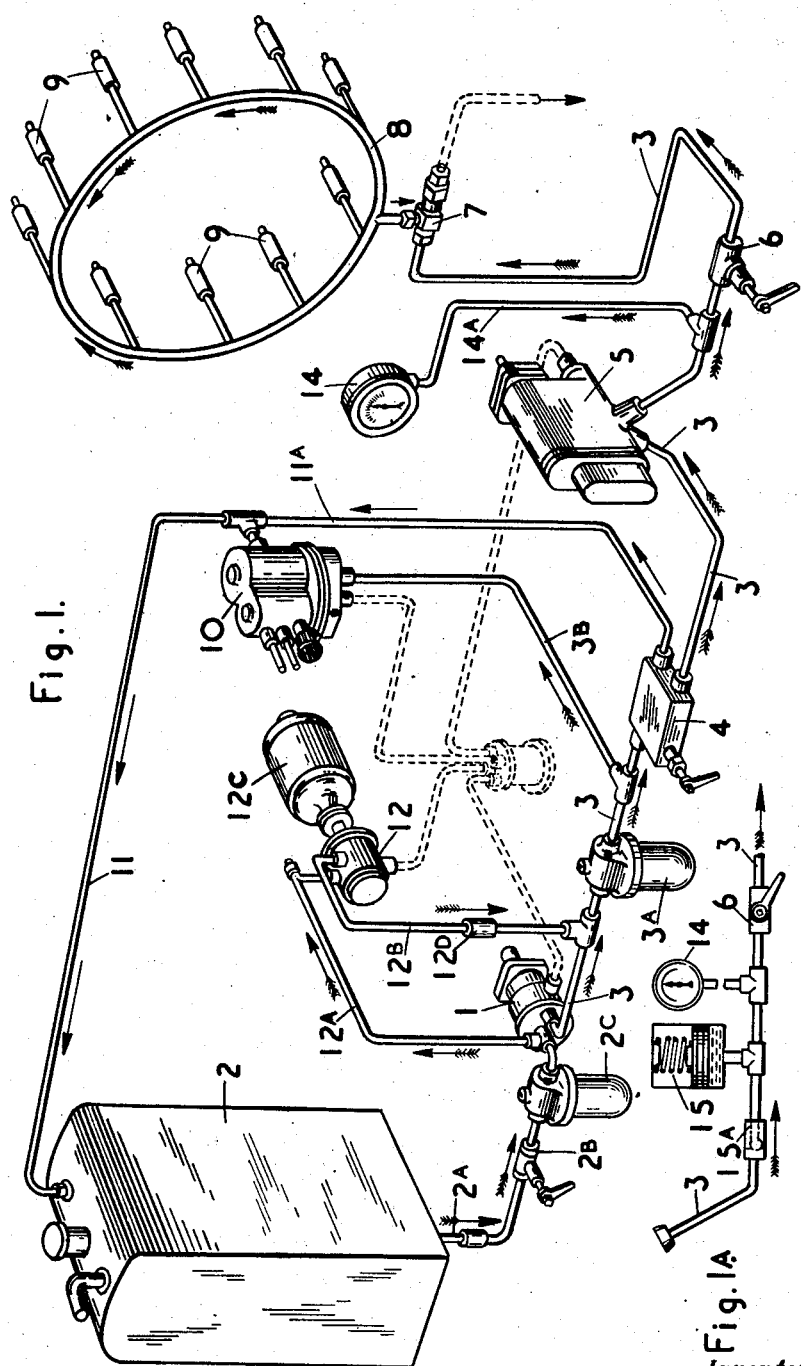

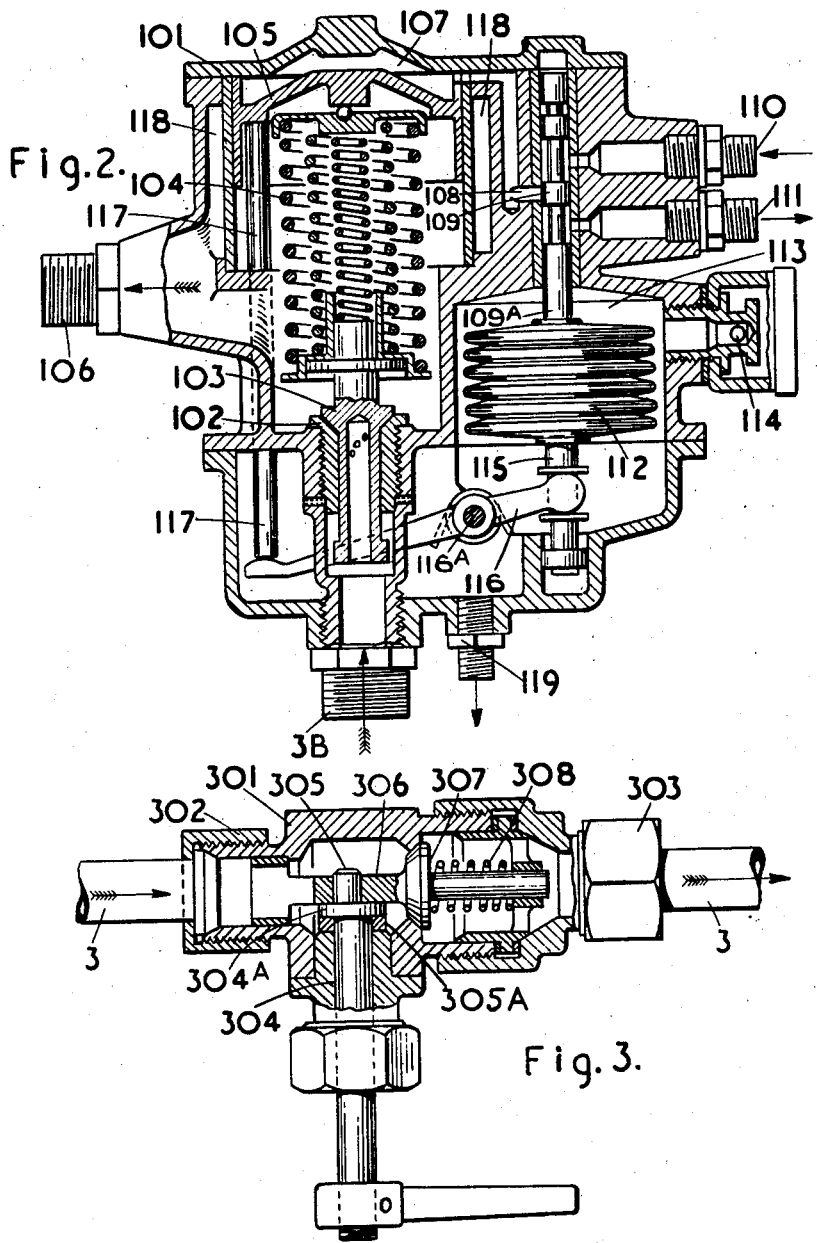

United States Patent Office 2,700,415
Patented Jan. 25, 1955.

2,700,415

LIQUID FUEL SUPPLY SYSTEM FOR AIRCRAFT COMBUSTION TURBINES

Geoffrey Bertram Robert Feilden, Lincoln, Daniel Norman Walker, Dunsfold, and Edwin Laurence Meeson, Golders Green, London, England, assignors to Power Jets (Research & Development) Limited, London, England, a British company Continuation of application Serial No. 622,494, October 16, 1945. This application February 19, 1951, Serial No. 211,602. In Great Britain October 30, 1941

Section 1, Public Law 690, August 8, 1946
Patent expires October 30, 1961

9 Claims. (Cl. 158—36.4)

This invention relates to fuel systems for engines or propulsive systems primarily for aircraft and of the kind comprising a compressor in the air output of which liquid fuel is burnt, the resultant energised gaseous mixture driving a gas turbine practically the whole shaft power output of which is devoted to driving the compressor whilst the residual energy of the exhaust gases is that which is utilised. Such engines or propulsive systems have the feature that they maintain and adjust their fuel/air ratio automatically and consequently they are controllable by regulation of the rate of fuel supply to the combustion system thereof. If in any given stable running conditions the rate of fuel supplied is increased the rotational speed increases (during which increase there is temporarily an increase in the fuel/air ratio). The fuel/air ratio being, in terms of mass it follows that if there were a fixed rate of fuel supply, variations in the density of the aspirate air, for example with change of height or barometer or temperature, would produce a variation in R. P. M.

This case is a continuation of applicants' co-pending, now abandoned, application Serial No. 622,494, filed October 16, 1945, and assigned to the assignee hereof.

The primary object of the invention is to afford a fuel system which is adapted to the requirements of such engines or propulsive systems more especially when applied to aircraft, in which application some form of altitude control is likely to be necessary. The invention if applied in its entirety has a large number of objects; it not only seeks to provide for what may be called ordinary running control in an extremely simple manner but also for governing in regard to overspeeding or at selected speed or both, governing in respect of altitude, the preservation of a wide range of speed control movement at all operational heights, starting and stopping, and in relation to other functional factors. The invention also seeks to provide fuel systems of considerable simplicity which are usable by the operation (in running) of a single control element. Thus, whilst in an ordinary aero-engine installation the pilot may have to control a throttle, mixture devices and airscrew control and other details, and may be required to exercise his skill and judgment in interpreting a certain number of instruments in order properly to use these controls, in the installation contemplated by this invention be simply has one control which he can regard either as a control of R. P. M. or of useful propulsive thrust and there is no need except for the sake of information, for him to observe instruments closely. The invention further affords means for rendering as automatic and simple as possible the procedure of starting and stopping. It can be assumed that engines or systems of the kind stated have certain fairly well defined idling speeds and that below these speeds they are not satisfactorily self-driving. The actual idling speed of such an engine may be determined by its ability to accelerate satisfactorily when the fuel supply is increased. The systems proposed by the invention enable a starting procedure to be adopted which is operationally extremely simple and in which certain safeguards are provided. The invention includes a system or method of starting which consists in using the elements and arrangement prescribed by the invention in a certain way.

Functionally, however, the procedure for starting involves rotating the turbine and compressor to a certain comparatively low speed so as to induce a flow of air through the engine, supplying fuel in a proper condition to be ignited and thereafter to burn, igniting the fuel, and thereafter further speeding up the R. P. M. until a speed is reached at which the engine becomes self-driving and controllable. In order to meet flying conditions it is desirable to ensure that a certain minimum speed is provided for, which can be regarded as the idling speed and this, in general terms, is the same as, or is of the same order as, the speed at which the engine can be regarded as controllably self-driving; we shall call it the idling speed. It is, also obviously necessary to afford means for stopping the engine and it is operationally preferable that starting means should be such as to be useful during flight. The invention seeks to fulfil these requirements and to conform with the starting procedure indicated, and also to take into account the other properties and limitations of such engines and propulsive systems. It will be assumed that the means by which the fuel is delivered into the engine prior to combustion are such as to have a well defined pressure/flow characteristic operating over whatever range conforms with the performance of the engine. For convenience such means will be called burners; it is at present contemplated that the fuel will be delivered into the combustion system through burners involving variable orifices or other means which define their pressure/flow characteristics.

According to the invention in its broadest aspect a fuel supply system for an engine or propulsive installation of the kind stated comprises a fuel pump driven by the engine and of a substantially positive displacement type, a relief valve or equivalent means for controlling the pressure of the delivered fuel, burners or equivalent means for passing fuel into the engine for combustion at rates related to the pressure of fuel applied thereto, and control valve or "throttle" means between the fuel pump and the burners for varying the effective pressure of supply to the burners. The throttle may be a simple valve such as a screw valve operated by hand or it may be operable by speed or pressure sensitive means or it may have both characteristics, i. e. it may be manually controllable and governed by speed or pressure. It may comprise two or more valves each of which is controlled in a different way, for example there may be a manually controlled valve in series with a valve controlled by means of a governor in accordance with the engine speed. The pump is preferably a gear type or like pump positively driven by the engine and it should have a sufficient capacity to deliver the maximum engine requirement in any foreseen condition of running; its minimum capacity will therefore presumably be selected having regard to the rate of supply required during the most rapid acceleration anticipated. The pump may be supplemented by a second pump utilised in starting and in that case preferably driven by a starter motor. In another arrangement the operation of the pump, at starting, may be supplemented by the provision of a pressure accumulator in place of the second pump in a manner which will be enlarged upon later. The fuel pressure controlling means may be a spring-loaded relief valve in a simple form or a relief valve the operative pressure of which is determined by a variable loading varied by hand, by speed or pressure responsive governor or, as is preferred, by means sensitive to the atmospheric pressure in which the engine is operating. In this last case the relief valve is preferably spring-loaded and the force exerted by the spring is varied (through servo-means) in accordance with the pressure at which the engine draws in air.

Preferably it is arranged that the pressure control by the relief valve is made interdependent with the local atmospheric pressure, or the local atmospheric pressure plus any Pitot pressure to which the air intake of the engine is exposed or to some pressure between these two; present investigation contributes the feature, that the controlling pressure should be approximately the atmospheric pressure plus 0.6 of the Pitot pressure, and the pressure sensitive element may be rendered susceptible to such proportion for example, by connecting it to a tapping at a suitable position in a Venturi tube or some other passage in which there is a velocity and consequently a pressure gradient. The atmospheric pressure or this pressure plus all or some of the Pitot pressure, is for convenience called the ambient pressure. By such means the relief valve can operate as a speed governing device for the engine.

In addition to the elements above set out there is preferably provided a stopcock, closing of which prevents any fuel from reaching the engine; and there may be non-return or check valves suitably located in the system to determine minimum pressures at which fuel will flow, and also to keep pipelines full. In conjunction with the throttle means stated there is preferably means to enable fuel to by-pass such throttle means for idling, the by-pass flow itself being controlled in accordance with the fuel pressure on the burners or manually or in accordance with some other factor such as speed.

In order that the invention may be better understood the following describes a practical embodiment of it, together with mention of various possible alternatives or elaborations.

The drawings herewith show, in—

Fig. 1, a diagram of a fuel system according to the invention.

Fig. 1A shows an alternative of one part of this.

Fig. 2, a sectional view of the barometrically-controlled relief valve.

Fig. 3, a sectional view of the proposed stop-cock.

Fig. 4, a sectional view illustrating the speed governor.

Figure 5:
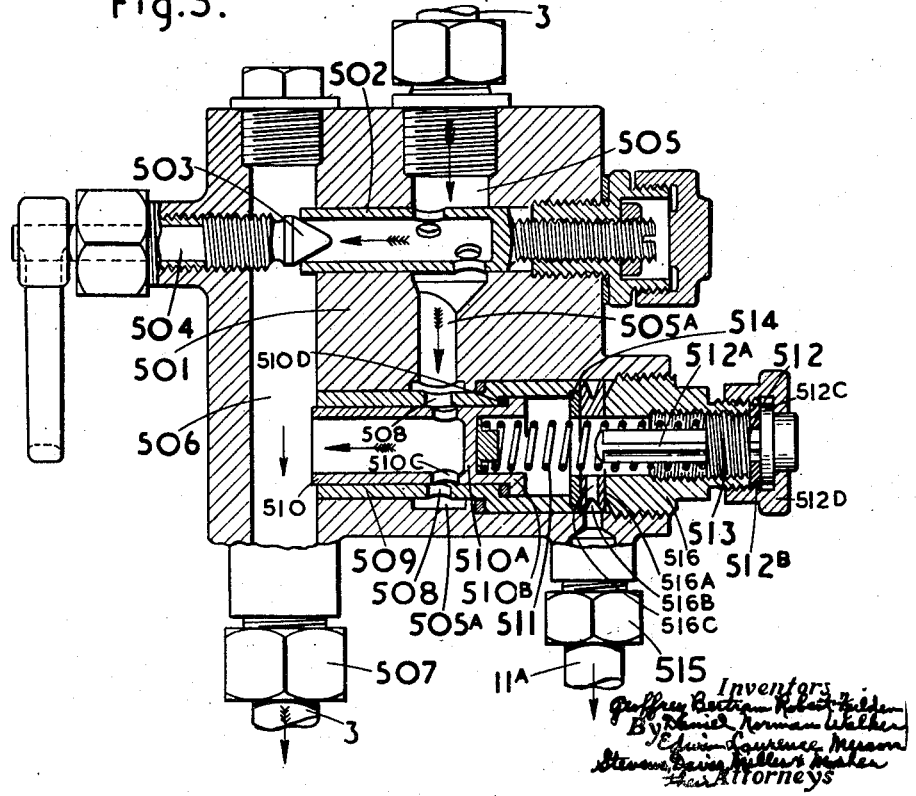

Fig. 5, a sectional view illustrating the combined throttle and by-pass (idling) valve.

The main fuel pump 1 is driven by the engine, and is preferably a simple gear-type pump. It is supplied from a fuel tank 2 through a pipe 2A with low-pressure stop-cock 2B and low-pressure filter 2C. The pump 1 delivers fuel by the main pressure pipe 3, through a high-pressure filter 3A, through manual throttle means indicated at 4, governor 5, high-pressure stop-cock 6, dump valve 7, to a manifold ring 8 from which branch the fuel burners 9. From the pipe 3 is a branch 3B leading to a relief valve indicated at 10, the relieved flow or "spill" from which returns to the tank 2, along the pipe 11 which may also return other spillage or leaks to the tank, such as that coming from the throttle unit 4, by the connection 11A. In parallel with the pump 1 is a supplementary pump circuit, comprising a feed branch 12A, pressure branch 12B, and pump 12 driven by the engine's starter-motor indicated at 12C. In the branch 12B is a non-return valve indicated at 12D. A burner pressure gauge 14 is connected by a branch 14A to the pipe 3 at a location where it will respond virtually to the pressure at the burners when the system is operating, whilst indicating the pressure developed in the system when for example, the cock 6 is closed. The dotted-in pipes represent drains from various glands, etc. which may leak a little.

In Fig. 1A, the modification is illustrated, wherein between the governor 5 and cock 6 a pressure accumulator 15 is provided on the pipe 3, and a non-return valve 15A immediately upstream in pipe 3, prevents its contents discharging back through the system when the engine is stopped.

The system of Fig. 1 thus outlined operates as follows. It is presupposed that the burners 9 deliver fuel for combustion into the engine, at a rate proportional to the fuel pressure applied to them. It is found preferable to use burners which have as nearly as possible a linear pressure/flow characteristic, though this is not believed essential.

To start the engine the cocks 2B and 6 are opened and the starter-motor 12C is energised. The engine is thus accelerated from rest, and the pump 12 as well as pump 1 are driven. It is not economical to make pump 1 sufficiently large in capacity, or to arrange its gear ratio with the engine, in such a way that its output in pressure and rate is adequate for starting, hence the provision of pump 12. At starting therefore it can be assumed that pump 12 is the mainly-operative source of fuel. It draws fuel by 2A, 12A, and delivers it into pipe 3 via 12B; so long as the motor 12C is running. This fuel, at an insufficient pressure to open the relief valve 10, flows by pipe 3, throttle by-pass (to be described) in 4, to the valve 7 (to be mentioned) and thence to the burners 9. Simultaneously, suitable igniting means in the engine start the required combustion. The engine being further accelerated partly by the motor 12C and increasingly by its own power, the pump 1 begins to be operative and quickly raises the fuel pressure in pipe 3. When this pressure exceeds that due to pump 12, the non-return valve 12D closes, and matters are so timed that in this phase of operation the motor 12C is cut out so that pump 12 stops, and the engine is now self-driving on the pump 1, its speed however being limited by the by-pass in the throttle unit 4.

To stop the engine all that is required is to shut off the cock 6. When this is done, the valve 7 connects the burner-manifold 8 to atmosphere so that it drains, and moreover any air pressure in the engine, to which the burners are exposed, tends to blow back through the burners and out of valve 7, preventing dribbling of the burners and emptying the manifold 8 which is found to be good practice.

The valve 7, which is called a dump-valve because it "dumps" unwanted fuel accumulation to waste, is a change-over valve operated by pressure in the pipe 3, and it is more fully described in co-pending application No. 597,911, filed June 6, 1945, and now Patent No. 2,619,162, by Geoffrey Bertram Robert Fielden. When there is operative pressure in pipe 3 downstream of cock 6, this valve connects pipe 3 to manifold 8, but when this pressure ceases, the valve opens manifold 8 to an atmospheric drain.

Reverting now to the condition when the engine is running at idling speed, if the throttle at 4 be opened the burner pressure is increased beyond that corresponding to idling, and consequently the rate of fuel supply is increased and the engine accelerates, until a new speed is reached when the mixture strength of the engine is again stabilised (corresponding to the new throttle setting). Since the pump 1 is selected and geared to deliver fuel at a higher rate than the corresponding engine demand, a proportion of the fuel pumped passes by 3B, to and through the relief valve at 10, and returns to the tank 2 by pipe 11. As will be described, the relief valve loading is varied with ambient pressure, so that the lower fuel demand which arises with lowered ambient pressure, is catered for by a drop in pressure in pipe 3 and correspondingly less flow through the burners 9. This enables the action of the throttle to be simplified; if there were no such provision, then as the ambient pressure varied the pilot or user would have to re-adjust his throttle to maintain a selected engine speed, and this re-adjustment would be theoretically continual during any change of height. Moreover, the range of movement of the throttle control would vary according to height, and the total range for throttle control if reasonably adequate near the ground, would be impractically small at altitude.

The governor at 5 is, in effect, a second throttle valve in series with the manual throttle, but only operative by closing at a selected top speed, by the action of centrifugally operating weights driven by the engine.

The device of Fig. 1A can be employed as a substitute for the pump 12. Where it is used, the starting procedure is as follows. The cock 2B is opened, and the motor 12C energised. The output of pump 1 then charges the accumulator 15. Thereafter the cock 6 is opened, and the contents of the accumulator 15, under its pressure, pass to the burners 9, the initial "burst" of pressure being adequate to ensure atomising of fuel and starting conditions generally. Meanwhile the pump 1 is of course still delivering, and the engine will accelerate to idling speed as required. Upon stopping by closing the cock 6, the pressure in the accumulator which can be assumed to be above the maximum required for starting, will remain "stored" because of the closing of the non-return valve 15A, and subject to drop by leakage is available for the next start. The spring or elastic medium in the accumulator may be selected to afford an appropriate rate.

The general operation of the system having been described, we shall now show how the more important components are made and operate.

Fig. 2 shows the barometric relief valve at 10. This is a servo-operated device, using pressure-fluid as its servo medium, which can either be engine lubricating oil, or the fuel itself. It is assumed that the servo-fluid is supplied at substantially constant pressure, this being achieved by appropriate valve means of any suitable known kind.

The relief valve unit comprises a casing or body 101 having a relief-valve seat 102 and relief valve 103 which is on a stem and spring-urged towards the seat by a pack of springs 104 selected to give the required rate. The spring pack 104 is housed in a cylindrical chamber, and reacts on the underside of a piston 105 sliding in this chamber. To the underside of the valve 103 is supplied the fuel from the pipe 3B (Fig. 1) at the full pressure of the pump 1. Fuel raising and passing the valve 103 is collected in the spring chamber and escapes through a union 106, to return by pipe 11 to the tank 2. The load of the spring pack 104 on the valve 103 is determined by the position of the piston 105. Servo fluid pressure acts above this piston in the space 107, which communicates by a duct 108 with a slide valve port controlled by a slide valve 109 which either admits servo fluid (which is supplied through union 110) to the space 107, or emits it from the space (through union 111). The valve 109 is preferably so dimensioned in relation to its port that when the valve is balanced it allows a very small flow from 110 to 111, maintaining the servo pressure in space 107.

The valve 109 is moved through a stem 109A, by the deformations of a flexible Sylphon box 112 which is evacuated and acts as a barometric device. The ambient pressure communicates with the interior of a chamber 113 through a vent 114 which is suitably protected to prevent ingress of foreign matter. The Sylphon box 112, housed in the chamber 113, is mounted at its lower end on a guided rod 115 which by means of a forked end is engaged by a rocker 116 borne at 116A; the tail of which rocker is acted upon by a pushrod 117 slidable in structure of the body 101; the upper end of the pushrod abutting against the underside of the piston 105. This push and rocker mechanism acts as a follow-up device, because the position of the piston 105 determines the location of the box 112 within its chamber 113; thus when an expansion of the box 112 causes valve 109 to rise, emitting servo-fluid from the space 107, the piston 105 rises (by influence of the spring pack 104) thereby reducing the fuel pressure required to open the valve 103, and simultaneously the pushrod 117 rises, dropping the bottom of the box 112. This train of action corresponds with a fall in ambient pressure in 113, i. e. with an increase of altitude (or decrease of forward speed in a case where Pitot pressure is a factor). Its result in the fuel system is to reduce the supply pressure for a given set of conditions, thus to reduce the fuel supply to the engine.

The foregoing description, as well as other descriptions herein of separate components, are intended for guidance as to function rather than for manufacture; where the construction is not obvious from the drawings, it will nevertheless be sufficient for one skilled in the art who has acquainted himself with the function, to put the device into practice. It will be observed that the barometrically controlled relief valve of Fig. 2 embodies jacketting as at 118; this is intended for circulation of the fuel in order to maintain reasonable and uniform temperatures in the assembly. The union at 119 is for drain of leakage or moisture.

Fig. 3 represents the stop-cock 6 in Fig. 1. The body structure 301 has an inlet union 302 and outlet 303. An operating spindle 304 passes into the body and has a flange at 304A, between which flange and a seat in the body 301 is a synthetic rubber washer 305A, for sealing purposes. The spindle 304 also has an eccentric pin 305 formed on its inner end, and this engages a transverse slot in a valve stem 306 which is guided in suitable bores in the body 301. The stem carries a valve head 307 co-operating with a seat in the body, and preferably urged towards this seat by a spring 308. When the spindle 304 is appropriately partially rotated, the valve is opened and contra-rotation closes it. It is found that such a cock is well suited to the relatively high pressures of fuel used and requires only a comparatively low torque for its operation. It is described because no ordinary types of commercial cock over a fairly wide range tested, has been found to give as satisfactory a result.

Fig. 4 shows diagrammatically the type of governor used at 5 in Fig. 1, considerably simplified for ease of functional description. A system of flyweights 401 is whirled by an engine-driven spindle 402 and under centrifugal influence urges a collar 403 axially against a spring 404, which in practice is adjustable or selected for a chosen speed of operation. The collar 403 on a rod 403A, causes this rod to move axially under governor operation, thus rocking a rocker 405 which in turn actuates (by a stem 406) a slide valve 407 which is a pressure-balanced valve controlling the effective opening of a series of fuel ports 408 which inter-connect an inlet union 409 and outlet 410. The ports 408 are stepped axially and overlap slightly in this sense, and the end port is so placed that with the valve 407 in its position of maximum closure, the end port is always clear, so that the governor cannot completely shut off the fuel flow in the pipe 3 in which it is connected. In practice the gland 406A of the stem 406, is replaced by a series of elastic or pliable diaphragms, to avoid frictional effects which militate against accurate governing. A drain union is provided at 411.

It will be appreciated that such a governor is in effect a second throttle valve in series with the manual throttle at 4 in Fig. 1.

Fig. 5 illustrates the throttle valve and bypass unit, 4 in Fig. 1. The function of this unit in the system is of considerable importance in that it enables a conventional simple single-lever throttle control to be used; whilst precluding inadvertent shutting-off of fuel supply to the engine. It is to be understood that this is more important in the type of engine under consideration than in, say, an orthodox reciprocating internal combustion engine, for in the present case if fuel supply ceases, there is no continuously operating ignition system to re-ignite it when the supply is restored.

The device comprises a body 501 supporting in a bore, a tubular seat element 502 for a so-called needle-type valve 503. The seating of the valve is adjustable relatively to a given closed position of the valve 503, by screwing. Thus adjustment need not involve the throttle-operating mechanism. The valve 503 is carried by a screwed spindle 504 operable by external means and glanded through the body 501. Holes in the element 502 allow fuel to enter it from a duct 505 connected to the fuel pipe 3. The downstream side of the valve 503 is a duct 506 leading passed fuel to an outlet union 507 and so to continuation of the pipe 3. The valve 503 is however by-passed by a duct 505A which leads to a ring of ports 508 in a cylinder 509 mounted in the body 501. In this cylinder slides a by-pass controlling valve 510, which is a tubular sleeve with a head or floor at 510A against which bears a spring 511 centred on a coaxial stem 512A of a setting pin 512 which is rotatable within an adaptor 516 screwed into the body 501. The adaptor 516 retains the cylinder 509 in position, a washer 516A being interposed between the inner end of the adaptor and the adjacent end of the cylinder. The washer has an external peripheral groove 516B and transverse holes 516C for draining fluid from the chamber containing the spring 511 through union 515. The stem 512A is fluted and on it is unrotatably slidable a collar 513 which is externally threaded and which screws along a thread in the adaptor 516 when the pin 512 is rotated. The pin 512 has a flanged head 512C engaged by a locking nut 512D threaded onto the outside of the adaptor 516. A washer 512B is used to effect a seal between the head 512C and the adaptor 516. It is seen that the spring 511 reacts against the collar 513 and its initial set load is adjustable by rotation of the stem 512A which is thereafter locked by 512D.

The valve 510 is externally flanged at 510B and has ports 510C to register (when the valve is idle) with the ports 508. By these registering ports, fuel from 505A passes into the valve the end of which is open to duct 506. The flange 510B seats through a washer 510D, against a step in the bore of the cylinder 509, when the valve is fully open; in its other position of rest however, with spring 511 compressed, the valve seats against a washer 514, preventing leakage. Between the two extremes a certain amount of leakage is to be expected and this is drained from the union 515.

When the valve 503 is closed and the engine starting procedure is commenced, fuel passes through 505, 505A, 508, 510C, into 506 and so to the burners. As acceleration continues and fuel pressure increases at the burners, i. e. in 506, the valve is pushed back against its spring 511, progressively cutting off the opening of ports 508, limiting the burner pressure to a predetermined value (determined by the effective force of the spring) and thereafter maintaining this value. The by-pass valve in short, acts as a pressure-reducing valve. When the throttle valve 503 is opened the pressure in 506 rises, consequent upon the increase in engine speed and higher pressure developed by the engine driven pump 1. This increased pressure causes the complete closure of the valve 510 which then "bottoms" on the washer 514. When the throttle valve 503 is closed, the pressure in 506 falls (due to reduction in engine speed) until the valve 510 opens again to maintain the constant pressure corresponding to the required idling condition.

The fuel system above described has been operated satisfactorily with kerosene fuel oil, and like fuels, at idling pressure and maximum pressures of the respective orders of 30 lbs. sq. in. and 500 lbs. sq. in., with rates of flow in the burners varying substantially linearly with pressure. There appears to be no reason why it should not operate with widely different pressures, but the devices as shown are intended primarily for employment in approximately this range.

We claim:

1. In a turbomachine including a turbine, means for continuously supplying a compressed working fluid thereto, liquid fuel combustion apparatus for heat energizing said working fluid prior to its entry into the turbine, at least one liquid fuel injection nozzle constituting a part of the combustion apparatus, and a system for supplying fuel to the combustion apparatus, wherein said fuel supply system comprises a positive displacement type fuel pump, means establishing a driving connection between said pump and the turbine so that fuel is supplied at a rate functionally related to turbine speed, the effective speed of the driving connection and the output capacity of said pump being so correlated that at all speeds above the idling speed of the turbine fuel is supplied by the pump at pressures of the order of hundreds of pounds per square inch and the fuel capacity of the pump exceeds the demand of the combustion apparatus, a pressure pipe connecting said pump to said nozzle, means responsive to the output pressure of said pump to maintain constant the pressure of fuel passed toward said nozzle and a throttle valve in said pressure pipe between said pressure responsive means and nozzle, said throttle valve having a throttling orifice distinct from the orifice of the nozzle, means to adjust the throttle valve to vary the rate of admission of fuel to said nozzle over a range from a maximum corresponding to full speed requirements to a minimum corresponding to idling speed requirements, and hence to vary the fuel pressure at said nozzle over a range of the order of hundreds of pounds per square inch, means independent of said pump for delivering fuel toward said nozzle during starting and means responsive to a predetermined fuel pressure in said pressure pipe for rendering said independent means inoperative.

2. In an aircraft propulsion turbomachine including a turbine, means for continuously supplying a compressed working fluid thereto and liquid fuel combustion apparatus for heat-energising said working fluid, the improvement that comprises a positive displacement type fuel pump, means establishing a driving connection between said pump and the turbine so that fuel is supplied by the pump at a rate functionally related to turbine speed, the effective speed of the driving connection and the output capacity of said pump being so correlated that at all speeds above the idling speed of the turbine the fuel supply capacity of the pump exceeds the demand of the combustion apparatus, a plurality of fuel injection nozzles constituting a part of the combustion apparatus, a pressure pipe connecting said pump to said nozzles, means responsive to the output pressure of said pump and to ambient pressure to maintain a predetermined order of difference between ambient pressure and the pressure of the fuel delivered toward said nozzles with the pressure of the fuel exceeding ambient pressure, and a throttle valve in said pressure pipe between said pressure responsive means and said nozzles for controlling in common the rate of admission of fuel to all of said nozzles.

3. In a turbomachine including a turbine, means for continuously supplying a compressed working fluid thereto and liquid fuel combustion apparatus for heat-energising said working fluid prior to its entry into the turbine, the improvement that comprises a positive displacement type fuel pump, means establishing a driving connection between said pump and the turbine so that fuel is supplied at a rate functionally related to turbine speed, the effective speed of the driving connection and the output capacity of said pump being so correlated that at all speeds above the idling speed of the turbine the fuel supplied by the pump exceeds the demand of the combustion apparatus, a plurality of fuel injection nozzles constituting a part of the combustion apparatus, said nozzles being designed for operation at hundreds of pounds per square inch of pressure, a pressure pipe connecting said pump to said nozzles, means responsive to the output pressure of said pump to maintain constant the pressure of fuel passed toward said nozzles, and a valve system in said pressure pipe between said pressure responsive means and said nozzles for controlling the admission of fuel to said nozzles, said system including a passageway having a throttle valve therein, a low pressure connection by-passing said throttle valve passageway, a normally open valve in said connection and means for closing said normally open valve.

4. In a turbomachine including a turbine, means for continuously supplying a compressed working fluid thereto and liquid fuel combustion apparatus for heat-energizing said working fluid prior to its entry into the turbine, the improvement that comprises a positive displacement type fuel pump, means establishing a driving connection between said pump and the turbine so that fuel is supplied at a rate functionally related to turbine speed, the effective speed of the driving connection and the output capacity of said pump being so correlated that at all speeds above the idling speed of the turbine the fuel supplied by the pump exceeds the demand of the combustion apparatus, a plurality of fuel injection nozzles constituting a part of the combustion apparatus, said nozzles being designed for operation at hundreds of pounds per square inch of pressure, a pressure pipe connecting said pump to said nozzles, means responsive to the output pressure of said pump to maintain constant the pressure of fuel passed toward said nozzles, and a valve system in said pressure pipe between said pressure responsive means and said nozzles for controlling the admission of fuel to said nozzles, said system including a passageway having a throttle valve therein, a low pressure connection by-passing said throttle valve passageway, a normally open valve in said connection and means responsive to the attainment of a predetermined pressure in said passageway for closing said normally open valve.

5. In a turbomachine including a turbine, means for continuously supplying a compressed working fluid thereto and liquid fuel combustion apparatus for heat-energising said working fluid prior to its entry into the turbine, the improvement that comprises a positive displacement type fuel pump, means establishing a driving connection between said pump and the turbine so that fuel is supplied at a rate functionally related to turbine speed, the effective speed of the driving connection and the output capacity of said pump being so correlated that at all speeds above the idling speed of the turbine, the fuel supplied by pump exceeds the demand of the combustion apparatus, a plurality of fuel injection nozzles constituting a part of the combustion apparatus, said nozzles being designed for operation at hundreds of pounds of pressure, a pressure pipe connecting said pump to said nozzles, means responsive to the output pressure of said pump to maintain constant the pressure of fuel passed toward said nozzle, and a valve assembly in said pressure pipe between said pressure responsive means and said nozzles for controlling the admission of fuel to said nozzles, said assembly including two intercommunicating passageways, a throttle valve in one of said passageways, a piston valve in the other of said passageways exposed to the pressure of the passageway containing said throttle valve at a position downstream of said throttle valve, and means resiliently biasing the piston valve to open position, said piston valve moving to closing position upon the attainment of a pressure in the throttle valve passageway sufficient to overcome the bias of said resilient means.

6. In a turbomachine including a turbine, a compressor driven by said turbine, and a liquid fuel combustion apparatus continuously receiving compressed air from said compressor and connected to supply combustion products to said turbine, the provision of a system for the supply of liquid fuel to said apparatus comprising a plurality of liquid fuel atomizing nozzle burners constituting a part of said combustion apparatus, a positive displacement type fuel pump, means establishing a driving connection between said pump and the turbine so that fuel is supplied at a rate functionally related to turbine speed, the effective speed of the driving connection and the output capacity of said pump being so correlated that at all speeds above idling speed of the turbine the fuel supply capacity of the pump exceeds the demand of the combustion apparatus, a pressure pipe system connecting said pump and said burners, throttling means in said pipe system between said burners and said pump, said throttling means being adjustable to vary the rate of fuel flow from a maximum corresponding to full speed to a minimum corresponding to idling speed, means responsive to the output pressure of said pump to maintain constant the pressure of the fuel reaching said throttling means, shut off valve means in said pressure pipe system to isolate said burners from said throttling means, and pressure responsive valve means in said pressure pipe system between said throttling means and said burners to prevent delivery of fuel below a pressure at which said burners can effectively atomize.

7. In a turbomachine including a turbine, a compressor driven by said turbine, and a liquid fuel combustion apparatus continuously receiving compressed air from said compressor and connected to supply combustion products to said turbine, the provision of a system for the supply of liquid fuel to said apparatus comprising a plurality of liquid fuel atomizing nozzle burners constituting a part of said combustion apparatus, a positive displacement type fuel pump, means establishing a driving connection between said pump and the turbine so that fuel is supplied at a rate functionally related to turbine speed, the effective speed of the driving connection and the output capacity of said pump being so correlated that at all speeds above idling speed of the turbine the fuel supply capacity of the pump exceeds the demand of the combustion apparatus, a pressure pipe system connecting said pump and said burners, throttling means in said pipe system between said burners and said pump, said throttling means being adjustable to vary the rate of fuel flow from a maximum corresponding to full speed to a minimum corresponding to idling speed, means responsive to the output pressure of said pump and to ambient pressure to maintain a predetermined order of difference between ambient pressure and the pressure of the fuel delivered towards said throttling means with the pressure of the fuel exceeding ambient pressure, and shut off valve means in said pressure pipe system to isolate said burners from said throttling means.

8. In an aircraft propulsion turbomachine including a turbine, means for continuously supplying a compressed working fluid thereto, and liquid fuel combustion apparatus for heat-energising said working fluid, the improvement which comprises a positive displacement type fuel pump, means establishing a driving connection between said pump and the turbine so that fuel is supplied by the pump at a rate functionally related to turbine speed, fuel injection nozzles constituting a part of the combustion apparatus, a pressure pipe connecting said pump to said nozzles, a throttle valve for controlling in common the rate of admission of fuel to all of said nozzles, and means responsive to the output pressure of said pump and to ambient pressure to maintain a predetermined order of difference between ambient pressure and the pressure of the fuel delivered to said throttle valve.

9. In an aircraft propulsion turbomachine including a turbine, means for continuously supplying a compressed working fluid thereto, liquid fuel combustion apparatus for heat-energizing said working fluid, a plurality of fuel-injection nozzles constituting a part of the combustion apparatus, a positive displacement type fuel pump driven by said turbine, so that fuel is supplied by the pump at a rate functionally related to turbine speed, a pipe connecting said pump to said nozzles for delivering fuel under pressure to said nozzles, and fuel supply control means connected to said pipe, the improvement that said control means includes means responsive to the fuel delivery pressure and to ambient atmospheric pressure, to maintain a predetermined order of difference of ambient pressure from the pressure of the fuel delivered, and a throttle valve connected in the path of said delivered fuel, for controlling the rate of admission of fuel to all of said nozzles in common.

References Cited in the file of this patent
UNITED STATES PATENTS

| | | |
|---|---|---|
| 1,857,556 | Lasley | May 10, 1932 |
| 2,078,957 | Lysholm | May 4, 1937 |
| 2,219,994 | Jung | Oct. 29, 1940 |
| 2,280,835 | Lysholm | Apr. 28, 1942 |